United States Patent
Fritz et al.

(10) Patent No.: US 9,903,390 B2
(45) Date of Patent: Feb. 27, 2018

(54) INTAKE BOX WITH SOUND-DAMPING PROPERTIES FOR AN AIR SUPPLY SYSTEM IN A COMPRESSION ARRANGEMENT

(71) Applicant: KNORR-BREMSE SYSTEME FÜR SCHIENENFAHRZEUGE GMBH, Munich (DE)

(72) Inventors: Matthias Fritz, Erfurt (DE); Melanie Gibson, Rödental (DE)

(73) Assignee: Knorr-Bremse System Fur Schienefahrzeuge GMBH, Munich (DE)

( * ) Notice: Subject to any disclaimer, the term of this patent is extended or adjusted under 35 U.S.C. 154(b) by 693 days.

(21) Appl. No.: 14/389,778

(22) PCT Filed: Apr. 4, 2013

(86) PCT No.: PCT/EP2013/057130
§ 371 (c)(1),
(2) Date: Oct. 1, 2014

(87) PCT Pub. No.: WO2013/150111
PCT Pub. Date: Oct. 10, 2013

(65) Prior Publication Data
US 2015/0063984 A1   Mar. 5, 2015

(30) Foreign Application Priority Data
Apr. 5, 2012   (DE) .................. 10 2012 007 027

(51) Int. Cl.
*F04D 29/66* (2006.01)
*F04D 29/40* (2006.01)
*B60T 17/00* (2006.01)

(52) U.S. Cl.
CPC .......... *F04D 29/663* (2013.01); *B60T 17/008* (2013.01); *F04D 29/403* (2013.01)

(58) Field of Classification Search
CPC ...... F04D 29/663; F04D 29/661; F04D 29/66; F04D 29/403; B60T 17/008
(Continued)

(56) References Cited

U.S. PATENT DOCUMENTS 8,555,666 B1 * 10/2013 Pettus .................... F24F 3/001
165/45
2007/0045042 A1   3/2007 Barz et al.

FOREIGN PATENT DOCUMENTS

| CN | 1989318 A | 6/2007 |
| CN | 102015398 A | 4/2011 |

(Continued)

OTHER PUBLICATIONS

Chinese Office Action dated Jan. 29, 2016.
(Continued)

*Primary Examiner* — Richard Edgar
*Assistant Examiner* — Michael Sehn
(74) *Attorney, Agent, or Firm* — Barnes & Thornburg LLP

(57) ABSTRACT

An intake box of an air supply system in a compressor arrangement, having an intake grill and an air intake pipe arranged on the compressor side, wherein the intake grill and the air intake pipe are arranged between a lower lid and an upper lid, wherein, in addition, a sound damping box for minimizing noise emissions is arranged between the intake grill and the air intake pipe, wherein the longitudinal dimension and width dimension of the sound damping box are each at least three times as large as the depth dimension of the sound damping box.

11 Claims, 2 Drawing Sheets

(58) Field of Classification Search
USPC .......................................................... 415/119
See application file for complete search history.

(56) References Cited

FOREIGN PATENT DOCUMENTS

| | | |
|---|---|---|
| DE | 10205591 A1 | 8/2003 |
| DE | 102011111625 A1 | 2/2013 |

OTHER PUBLICATIONS

English Translation of Notification Concerning Transmittal of International Preliminary Report on Patentability and Written Opinion of the International Search Authority for International Patent Application No. PCT/EP2013/057130, dated Apr. 4, 2013.
Search Report for International Patent Application No. PCT/EP2013/057130; dated Sep. 13, 2013.

* cited by examiner

INTAKE BOX WITH SOUND-DAMPING PROPERTIES FOR AN AIR SUPPLY SYSTEM IN A COMPRESSION ARRANGEMENT

PRIORITY CLAIM

This patent application is a U.S. National Phase of International Patent Application No. PCT/EP2013/057130, filed 4 Apr. 2013, which claims priority to German Patent Application No. 10 2012 007 027.6, filed 5 Apr. 2012, the disclosures of which are incorporated herein by reference in their entirety.

FIELD

Disclosed embodiments relate to an intake box of an air supply system in a compressor arrangement, comprising an intake grille and an air intake pipe arranged on the compressor side, wherein the intake grille and the air intake pipe are arranged between a lower cover and an upper cover.

SUMMARY

Disclosed embodiments relate to vehicle construction, in particular rail vehicle construction. In rail vehicles, rising standards for noise protection, in particular in rail vehicles which run in residential areas, require an ever greater expenditure for sound optimization of the compressor arrangement. In the field of passenger transport, particularly high requirements apply to the maximum permitted sound emission.

BRIEF DESCRIPTION OF THE FIGURES

The invention will now be explained in more detail with reference to the figures. The drawings show.

DETAILED DESCRIPTION OF THE DISCLOSED EMBODIMENTS

Figure 1:
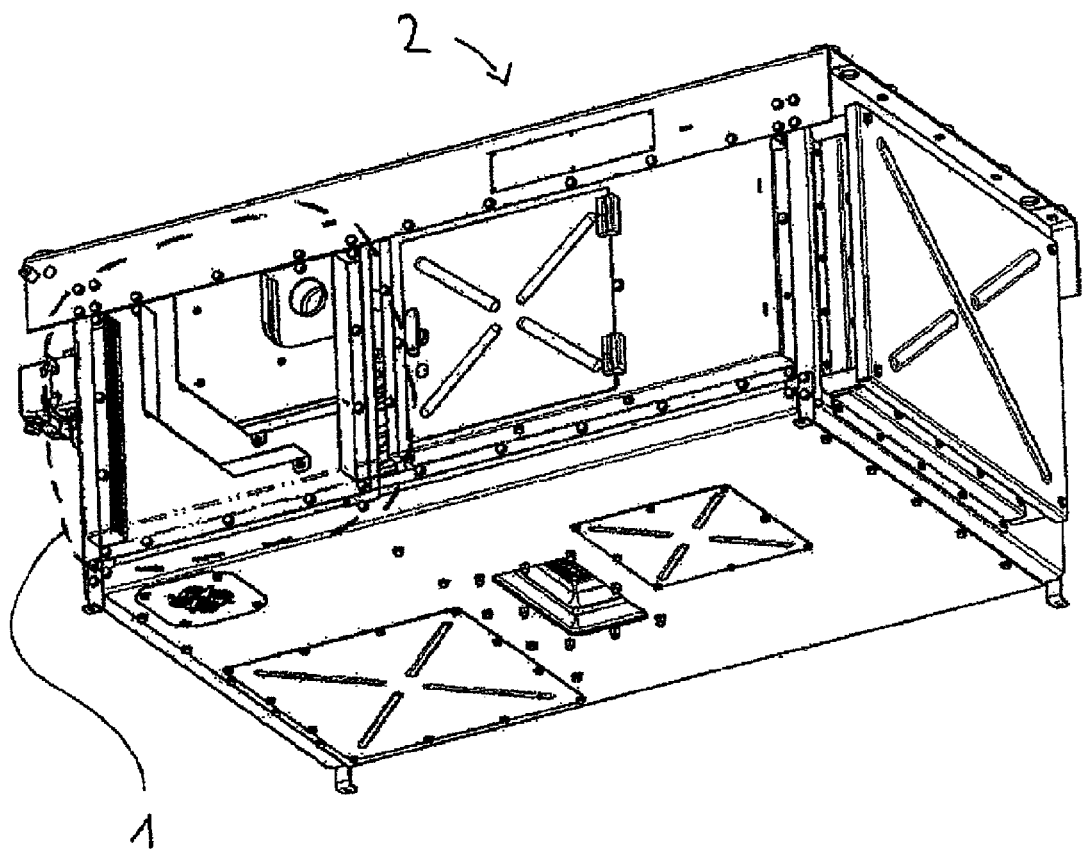
FIG. 1 is a perspective depiction of an air supply system with a sound damping intake box arranged on the side.

In the past, in the field of rail vehicles, a simple catchment protection system was used. In some cases, these systems had poor sound traps. Here air is drawn in through a flat cylindrical body attached to an outer wall. The small intake area presents the risk of clogging of the required intake area. Also, approximately square intake sound dampers are used which are lined with insulating material. Because of the construction form, the sound damper is difficult to integrate into existing systems. Another possibility of damping sound is offered by intake dampers which are fitted in front of the intake. Here air is conducted into voluminous, usually round containers. The sound is reflected multiple times, calmed and hence the noise level of the sound waves reduced.

The generally known prior art discloses that in rail vehicles, in particular for the supply of compressed air to the braking system, encapsulated air supply systems are fitted. These air supply systems consist of a compressor assembly, a frame and frequently an air dryer or reservoir. Since the air supply systems in trains are often positioned below the floor without additional protection from the environment, they are encapsulated. The capsule protects the compressor from weather influences and particles thrown up by the travel wind, it also serves for noise reduction and can also be used to guide the cooling air appropriately.

For sound insulation reasons, the capsules are lined with insulating material, but this is not always possible or beneficial because of the limited space available and the guarantee of function. Furthermore, for technical reasons encapsulated air supply systems frequently have various orifices and holes through which sound can escape unhindered. Examples are the air outlet and inlet openings, wherein the latter are more critical since piston compressors generate disruptive valve noise and intake noise. In the past, the sound could indeed be damped, but not to an acceptable level with conventional sound dampers. Also conventional sound dampers are voluminous and take up additional construction space, which is limited in the interior of encapsulated air supply systems.

Disclosed embodiments create a flat, compact intake box which can be integrated in the capsule wall of an air supply system, in particular for encapsulated compressor arrangements.

According to the disclosed embodiments, a sound damping box for minimizing noise emission is arranged between the intake grille and the air intake pipe, wherein the length and width dimensions of the sound-damping box are each at least three times as large as the depth dimension of the sound damping box. The particularly flat design of the intake box allows a compact integration of the intake box in the capsule wall of the air supply system.

According to at least one disclosed embodiment, an air guide plate for minimizing noise emission is arranged between the intake grille and the sound damping box, such that an inflow region is created between the intake grille and the air guide plate, a labyrinth is created between the air guide plate and the sound damping box, and an expansion region, in which the air intake pipe is arranged, is created between the sound damping box and a terminal plate.

Due to this division, within an intake box having a large volume, various action regions are created, wherein the path length of the sound waves is extended by these action regions to reduce the sound level of the sound waves further. In the inflow region, air flows through the intake grille into the inflow region. The intake grille is present to hinder a direct intake of foreign bodies and thus avoid an accumulation of larger foreign bodies inside the box. Also the intake grille prevents small animals from nesting there. To guarantee an optimum function of the intake device, the position of the intake box should be selected system-specifically, as far as possible from warm air outlets. Warm air outlets are those which have air temperatures above 60° C.

The inflow region is located behind the intake grille and is limited by the air guide plate. The air guide plate firstly protects the sound damping box from the direct influence of moisture during cleaning work or in the rain, and secondly the air guide plate conducts the intake air to the labyrinth. The air passes through the labyrinth and the sound damping box to the expansion region, where the air intake pipe of the compressor is arranged. The noise emission generated by the compressor passes through in the opposite direction. It expands conically in the expansion region and passes through the sound damping box, lowering the sound level of the sound waves and hence reducing the noise emission.

Furthermore, the air guide plate with the sound damping box may form a sound trap at an open end, wherein the distance x between the air guide plate and the sound damping box is smaller than the length y of the sound trap of the air guide plate. The ratio $x<y$ is of greatest importance for achieving a sound damping effect of this arrangement. The sound damping effect can be reinforced by the arrangement of an insulating mat on the air guide plate in the region of length y in the labyrinth.

According to another disclosed embodiment, the sound damping box has at least one air inlet opening, wherein the at least one air inlet opening has an area which has at least the size of a smallest cross-section area of the air intake pipe. Both air drawn in through the compressor and the sound waves from the compressor are guided through the at least one air inlet opening. To extend the path of the sound waves further, the at least one air inlet opening may be arranged in the upper portion of the sound damping box.

The size of the cross-section area of the at least one air inlet opening is configured as small as possible, for little noise emission to escape, but as large as necessary to draw in sufficient air. Therefore the size of the at least one air inlet opening corresponds to the smallest cross-section area of the air intake pipe. If the air inlet opening is not adequately dimensioned, the flow resistance and the intake noise increase.

The advantage of the solution lies in particular in that the sound damping box has at least one insulating panel on each of the lower cover and the upper cover, so that an air chamber is formed between the insulating panels, wherein a cross-section area of the air chamber is greater than the smallest cross-section area of the air intake pipe. The insulation panels are for example made from melamine foam, wherein an additional coating of fleece or aluminum is conceivable for protection against moisture or damage during installation. The noise wall of the air supply system may form a substitute for the lower cover.

Gap sizes are determined by the minimum necessary size of the cross-section area and by the installation height available, taking into account the insulating panel thickness. The largest possible insulating panel thickness for achieving optimum sound damping properties is around 20 mm. It is however noted that the thicker the insulating panels, the better the sound damping properties. Due to the arrangement of the insulating panels over a large area in the sound damping box, the sound waves pass through the insulating panels at least twice, wherein the sound level of the sound waves is reduced on each reflection.

Furthermore, the interior of the sound damping box may be filled completely or partially with sound-insulating material and/or a sinter material. Optionally, for sound damping, the entire interior of the sound damping box can be filled with an air-permeable sinter material, optionally sinter bronze or any air-permeable fabric. Such air-permeable fabrics may be woven polymers, in particular polyethylene and/or PTFE. A combination of sound damping materials for filtering different frequencies and reducing amplitudes is particularly advantageous.

Optionally, a path of the sound waves through the air chamber tangentially along the insulating panels is at least twice as large as the distance between the two insulating panels. The longer the path of the sound between the two insulating panels, the better the sound damping effect. This is because the sound waves are reflected more often between the damping panels, wherein the sound level of the sound waves is reduced on each reflection.

Disclosed embodiments include the technical teaching that at least one spacer bolt is arranged between the insulating panels, to prevent the insulating panels from being drawn together due to a reduced pressure or ageing phenomena. The spacer bolts are arranged such that they each support the other insulating panel of an opposing construction half. The number and position of the spacer bolts is selected such that the smallest cross-section area of the intake pipe has at least the same size as the cross-section area of the air chamber between the insulating panels.

It is furthermore proposed that the cross-section area of the air flow openings of the intake grille is at least twice as large as the smallest cross-section area of the air intake pipe. In the case that any of the openings of the intake grille become blocked by foreign bodies being drawn in, an area of the openings of the intake grille which is twice as large offers adequate security that the compressor can draw in sufficient air.

According to at least one disclosed embodiment, the intake grille is set back by a distance z in the direction of the air intake pipe, forming a prechamber, wherein a slot-like gap is arranged in the prechamber in front of the intake grille to allow the escape of any moisture which has penetrated the prechamber. Setting back the intake grille offers additional protection from foreign bodies, since these must be small enough to penetrate the prechamber before they are drawn in.

The advantage of the solution, of efficient minimization of noise emission, results in particular in that sound waves originating from the air intake pipe, starting from the compressor, propagate through the sound damping box, wherein the arrangement of the insulating panels over a large area in the sound damping box reduces the sound level of the sound waves.

The expansion region in which the air intake pipe is arranged is to calm the sound waves originating from the compressor, to then conduct them into the sound damping box. In the sound damping box, the sound level of the sound waves is reduced due to the insulating panels, wherein the narrow air inlet openings hinder the penetration and escape of the sound waves into and from the sound damping box, so that this has an additional sound damping effect. The tangential edge of the insulating panels towards the expansion region has at least the same length as the air inlet opening in the sound damping box, not to obstruct the air flow.

Optionally, the construction of the intake box is designed in two pieces, wherein the intake grille, the air guide plate, the termination plate, the upper part of the sound damping box and the upper insulating panel are fastened to the upper cover. A two-piece construction substantially facilitates the exchange of insulating panels, and due to the ease of handling, prevents damage to the insulating panels on installation.

FIG. 1 shows an air supply system 2 on which an intake box 1 is arranged on the side of the housing. The length of the flat intake box 1 corresponds at least to six times the depth of intake box 1. The height of the intake box 1 is dependent on the height of the air supply system 2. However the length of the intake box 1 is greater than the height available. The upper cover 6 of the intake box 1 replaces the side panel of the air supply system 2. The housing wall of the air supply system 2 terminates the intake box 1 towards the air supply system 2. A minimum additional installation space is required due to the flat design of the intake box 1.

Figure 2:
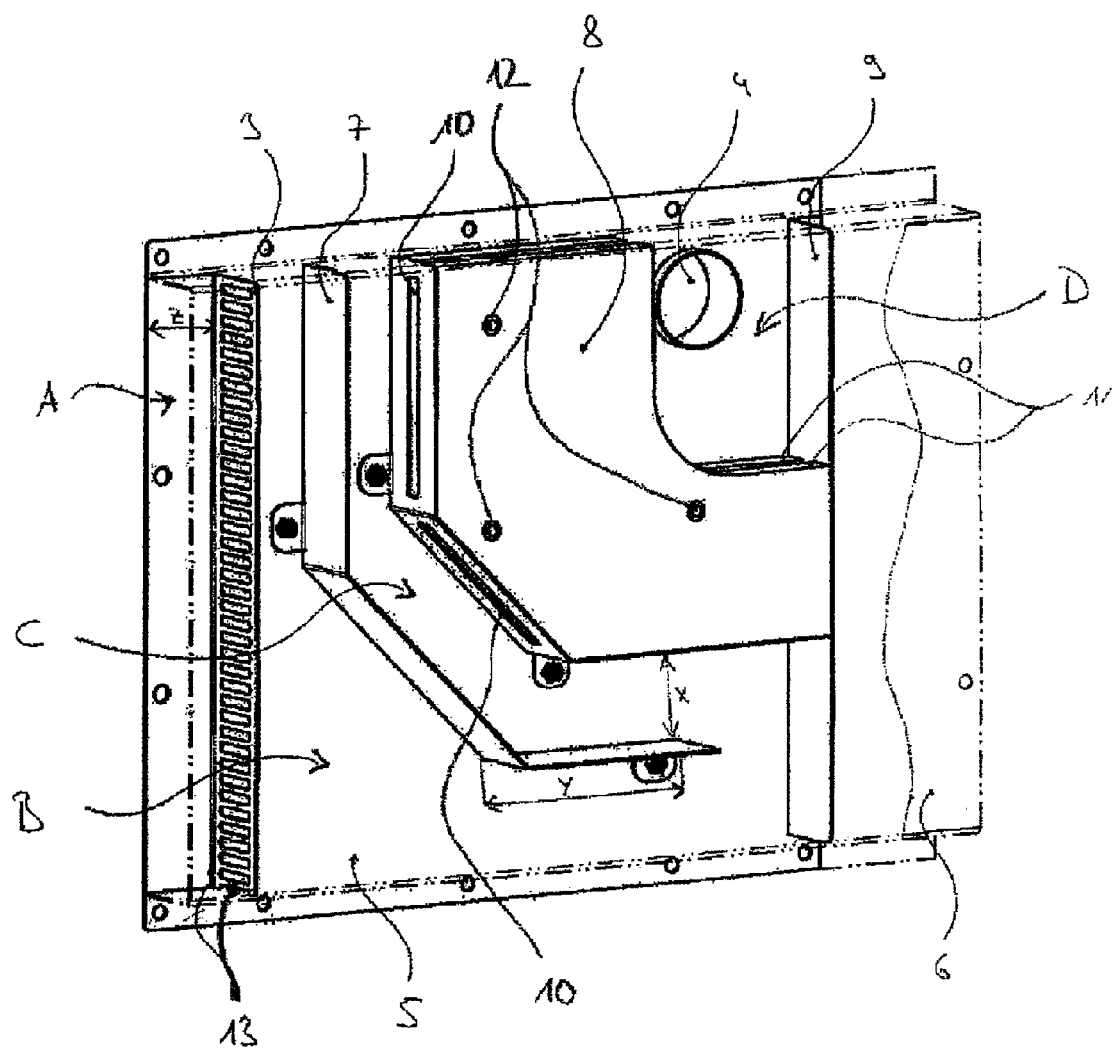
FIG. 2 is an enlarged perspective cross-section view of the sound damping intake box according to FIG. 1.

The intake box 1, shown in more detail in FIG. 2, of the air supply system 2 from FIG. 1, has four action regions. A prechamber A arranged in front of the intake grille 3 has a slot-like gap 13 immediately in front of the intake grille 3 to allow the escape of moisture which has penetrated the prechamber A. The prechamber A is formed by the intake grille 3 being set back by a distance z. An inflow region B, separated from the labyrinth C by the air guide plate 7, is arranged behind the intake grille 3. Such an arrangement of the air guide plate 7 extends the path from the prechamber A to an air intake pipe 4 arranged in an expansion region D. A sound damping box 8 is formed between the labyrinth C and the expansion region D, in that insulating panels 11 are arranged on a lower cover 5 and an upper cover 6.

The insulating panels 11 are supported by three spacer bolts 12 which are arranged between the insulating panels 11 such that an air chamber is formed between the insulating panels 11, wherein a cross-section area of the air chamber is greater than the smallest cross-section area of the air intake pipe 4. On a side wall towards the labyrinth C, the sound damping box 8 has two air inlet openings 10, wherein the air inlet openings 10 have an area which has at least the size of the smallest cross-section area of the air intake pipe 4. The air guide plate 7 with the sound damping box 8 forms a sound trap, wherein the distance x between the air guide plate 7 and the sound damping box 8 is smaller than the length y of the sound trap of the air guide plate 7.

The invention is not restricted to the exemplary embodiment disclosed above. Rather, derivations from this are conceivable which are included in the scope of protection of the following claims. It is for example also possible to reinforce the sound damping effect by the arrangement of an insulating mat on the air guide plate 7 in the region of the length y in the labyrinth C. Furthermore, fewer or more spacer bolts 12 may be used to support the insulating panels 11.

In addition it is pointed out that the term "comprising" does not exclude any other elements, and that "a" or "one" does not exclude a multiple.

LIST OF REFERENCE NUMERALS

1 Intake box
2 Air supply system
3 Intake grille
4 Air intake pipe
5 Lower cover
6 Upper cover
7 Air guide plate
8 Sound damping box
8 Terminal plate
9 Air inlet opening
10 Insulating panel
11 Spacer bolt
12 Gap
A Prechamber
B Inflow region
C Labyrinth
D Expansion region
x Distance
y Length
z Distance

The invention claimed is:

1. An air intake box of an air supply system in a compressor arrangement, the intake box comprising:
an intake grille;
an air intake pipe arranged in proximity to a compressor;
a lower cover; and
an upper cover,
wherein the intake grille and the air intake pipe are arranged between the lower cover and the upper cover,
wherein the compressor arrangement further comprises a sound damping box that minimizes noise emission and is arranged between the intake grille and the air intake pipe,
wherein length and width dimensions of the sound damping box are each at least three times as large as a depth dimension of the sound damping box,
wherein sound waves originating from the air intake pipe, starting from the compressor, propagate through the sound damping box,
wherein the sound damping box has at least one insulating panel on each of the lower cover and the upper cover, and
wherein arrangement of the insulating panels over a large area in the sound damping box reduces the sound level of the sound waves.

2. The air intake box of claim 1, further comprising an air guide that minimizes noise emission and is arranged between the intake grille and the sound damping box, such that an inflow region is created between the intake grille and the air guide plate, a labyrinth is created between the air guide plate and the sound damping box, and an expansion region, in which the air intake pipe is arranged, is created between the sound damping box and a termination plate.

3. The air intake box of claim 2, wherein the construction of the intake box is designed in two pieces, wherein the intake grille, the air guide plate, the termination plate, an upper part of the sound damping box and the upper insulating panel are fastened to the upper cover.

4. The air intake box of claim 1, further comprising an air guide plate, which, in combination with the sound damping box, forms a sound trap, wherein a distance between the air guide plate and the sound damping box is smaller than the length of the sound trap of the air guide plate.

5. The air intake box of claim 1, wherein the sound damping box has at least one air inlet opening, wherein the at least one air inlet opening has an area which has at least the size of a smallest cross-section area of the air intake pipe.

6. The air intake box of claim 1, wherein an air chamber is formed by the insulating panels, and wherein a cross-section area of the air chamber is greater than the smallest cross-section area of the air intake pipe.

7. The air intake box of claim 6, wherein a path of the sound waves through the air chamber tangentially along the insulating panels is at least twice as large as the distance between the two insulating panels.

8. The air intake box of claim 1, wherein an interior of the sound damping box is filled completely or partially with sound-insulating material and/or a sinter material.

9. The air intake box of claim 1, wherein at least one spacer bolt is arranged between the insulating panels, to prevent the insulating panels from being drawn together due to a reduced pressure or ageing phenomena.

10. The air intake box of claim 1, wherein the cross-section area of the air flow openings of the intake grille is at least twice as large as the smallest cross-section area of the air intake pipe.

11. The air intake box of claim 1, wherein the intake grille is set back by a distance in the direction of the air intake pipe, forming a prechamber, wherein a slot-like gap is arranged in the prechamber in front of the intake grille in order to allow the escape of any moisture which has penetrated the prechamber.

* * * * *